A. L. POWELL.
TIRE ARMOR.
APPLICATION FILED MAY 17, 1913.

1,098,588.

Patented June 2, 1914.
2 SHEETS—SHEET 1.

Witnesses
F. B. Worden.
M. C. Lucas

Alvah L. Powell
Inventor,
by May A. Schmied
Attorney

A. L. POWELL.
TIRE ARMOR.
APPLICATION FILED MAY 17, 1913.
1,098,588.
Patented June 2, 1914.
2 SHEETS—SHEET 2.
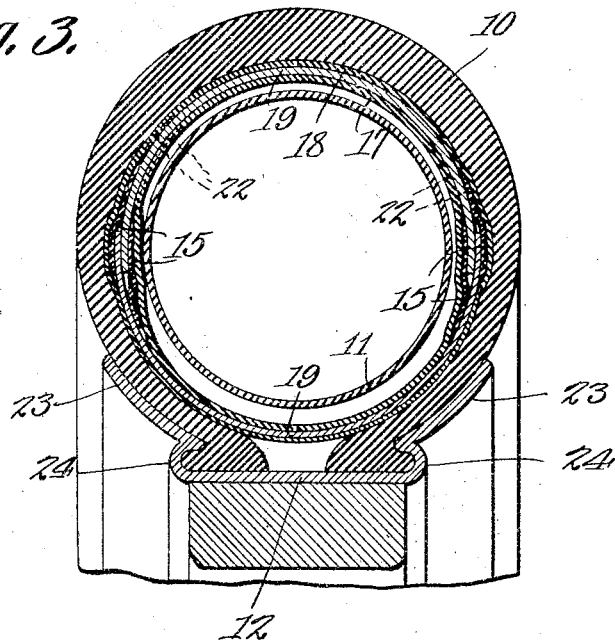
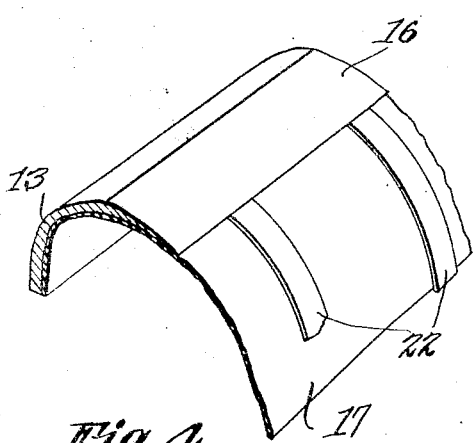
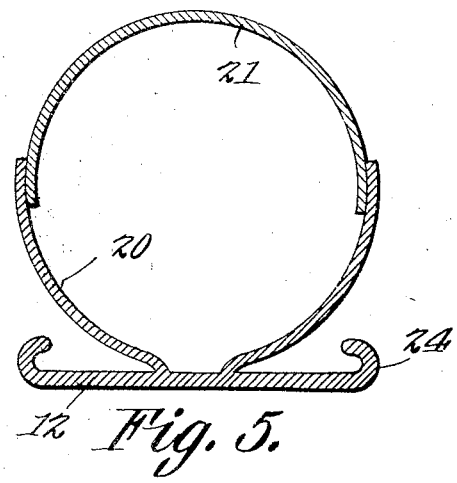
Alvah L. Powell
Inventor,
Witnesses

UNITED STATES PATENT OFFICE.

ALVAH L. POWELL, OF STOCKTON, CALIFORNIA, ASSIGNOR OF ONE-FIFTIETH TO HENRY E. WOLFE, OF STOCKTON, CALIFORNIA.

TIRE-ARMOR.

1,098,588.  Specification of Letters Patent.  Patented June 2, 1914.

Application filed May 17, 1913. Serial No. 768,295.

*To all whom it may concern:*

Be it known that I, ALVAH L. POWELL, a citizen of the United States, residing at Stockton, in the county of San Joaquin and State of California, have invented certain new and useful Improvements in Tire-Armors, of which the following is a specification.

This invention relates to pneumatic tires which are provided with an internal armor, the same being interposed between the inner tube and the casing of the tire, and serving to protect the former against puncture.

It is the object of the invention to provide a tire armor of the kind stated which is simple and inexpensive, and which is so constructed and arranged that it affords complete protection without reducing the resiliency of the tire.

Figure 1:
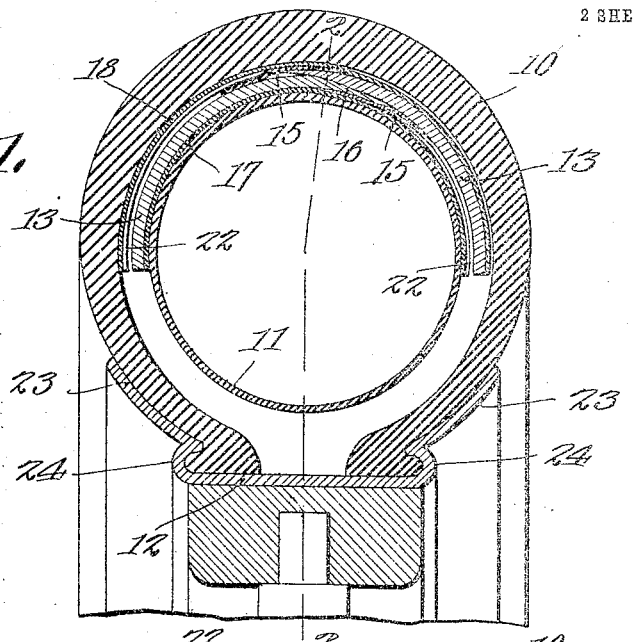
Figure 2:
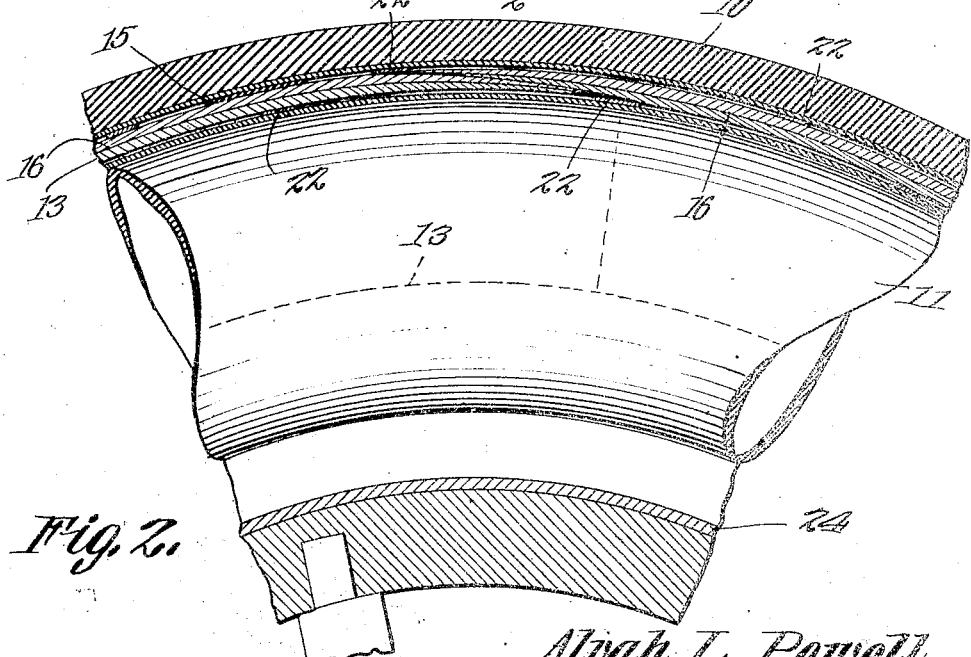

In the accompanying drawings forming a part of this specification, Figure 1 is a cross-section showing one embodiment of the armor; Fig. 2 is a longitudinal section on the line 2—2 of Fig. 1; Fig. 3 is a cross-section of a tire showing another embodiment of the armor; Fig. 4 is a perspective view showing the means for protecting the cover of the armor, and Fig. 5 is a cross-section showing diagrammatically another embodiment of the armor.

In the drawings, 10 denotes the outer casing of an ordinary pneumatic tire, said casing inclosing the usual inflatable tube 11. The tire is secured to the felly of the wheel by a rim 12 in the ordinary manner.

The armor shown in Figs. 1 and 2 comprises a ring consisting of two transversely curved sections 13. Each section is substantially quadrantal transversely, so that when the sections are assembled side by side, the ring is substantially semi-circular in cross-section. The sections are made of thin sheet steel or other suitable metal. The diameter of the ring is such that it may completely encircle the inner tube 11 circumferentially, and it is placed between the outer portion of said tube and the tread portion of the casing 10, as shown in Fig. 1. The ring also extends down the sides of the inner tube and terminates at or about the middle thereof. Thus, the entire surface of the inner tube, liable to puncture, is covered and protected.

The adjacent ends of the sections 13 slidably overlap, and are connected by strips 15 of any suitable resilient material, which permit outward sliding movement and tend to draw the sections back to their normal overlapping position. The overlapping ends may be beveled as shown at 16, forming a smooth joint, which allows free and easy movement and maintains a circular section.

In order to prevent the armor from chafing and wearing the tire casing and the inner tube, the section 13 which lies next to the inner tube has its inner surface covered with rubber or other soft material, as indicated at 17. This material extends from the lapping end of the section a sufficient distance to cover the inner surface of the other section. The outer surface of the last-mentioned section has a protecting covering 18 which extends from the lapping end thereof over the outer surface of the first-mentioned section. Thus, both sections are lined on both sides, and all danger of the armor cutting the tire casing or the inner tube is obviated.

The two sections 13 are also divided transversely, and their ends are slidably overlapped as shown in Fig. 2, so that the armor may yield circumferentially. The transverse overlapping of the sections permits the armor to yield transversely. It will therefore be evident that the armor does not stiffen the tire but yields freely therewith, and the resiliency of the tire is therefore not reduced to any appreciable degree.

The modified form of armor shown in Fig. 3 comprises two sections 19 which are substantially semi-circular so that they completely encircle the inner tube transversely. Each section is slightly greater than a semi-circle so that the adjacent ends may overlap as before, the overlapping portions being at the sides of the inner tube.

Fig. 5 shows an armor having two sections, 20 and 21, respectively, arranged in the same manner as the last described armor, with the exception that the section 20 is formed integral with the rim 12.

Various other modifications may be made without departure from the scope of the invention as hereinafter claimed.

In order to prevent the overlapping ends of the sections from cutting or wearing the covering 17 and 18, the projecting portions thereof may be faced with transversely extending thin metal strips 22. Fig. 4 shows these strips applied to the covering 17.

To prevent the armor from injuring the tire in the event of the collapse of the latter, the rim 12 will be provided with side flanges 23 projecting outward from the usual tire base engaging lips 24 of the rim. These flanges extend outward along the sides of the tire casing a sufficient distance to afford a secure support for the tire if it should flatten, and they effectually prevent injury of the tire as well as injury to the armor and the inner tube.

I claim:

A tire armor comprising annular metallic sections arranged side by side and encircling the inner tube of the tire, said sections being curved transversely and their adjacent ends slidably overlapping, a protecting covering on the inner surface of one of the sections and projecting therefrom over the exposed inner surface of the other section, and a protecting covering on the outer surface of the last-mentioned section and projecting therefrom over the exposed outer surface of the first-mentioned section, the projecting portions of said coverings having their sides which are next to the sections faced with transverse wear strips.

In testimony whereof I affix my signature in presence of two witnesses.

ALVAH L. POWELL.

Witnesses:
EMILY F. CAMP,
M. A. SCHMIDT.